(12) United States Patent
Xia

(10) Patent No.: US 9,584,870 B2
(45) Date of Patent: Feb. 28, 2017

(54) CONTENT LOCATING METHOD AND CONTENT DELIVERY NETWORK NODE

(75) Inventor: Hongfei Xia, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 1255 days.

(21) Appl. No.: 13/259,305

(22) PCT Filed: Sep. 7, 2009

(86) PCT No.: PCT/CN2009/073789
§ 371 (c)(1),
(2), (4) Date: Oct. 5, 2011

(87) PCT Pub. No.: WO2010/115331
PCT Pub. Date: Oct. 14, 2010

(65) Prior Publication Data
US 2012/0023530 A1    Jan. 26, 2012

(30) Foreign Application Priority Data

Apr. 10, 2009    (CN) .......................... 2009 1 0134425

(51) Int. Cl.
*H04N 7/173* (2011.01)
*H04N 21/61* (2011.01)
(Continued)

(52) U.S. Cl.
CPC ......... *H04N 21/6125* (2013.01); *H04L 67/16* (2013.01); *H04L 67/327* (2013.01);
(Continued)

(58) Field of Classification Search
CPC ........... H04N 21/2747; H04N 21/6547; H04N 21/2225; H04N 21/23113; H04N 21/23116;
(Continued)

(56) References Cited

U.S. PATENT DOCUMENTS 8,416,685 B2 * 4/2013 Wu ..................... H04L 12/2801
                                                                370/230
2003/0002865 A1 * 1/2003 Matsui et al. ................. 386/125
(Continued)

FOREIGN PATENT DOCUMENTS

CN    1941736 A    4/2007
CN    1972442 A    5/2007
(Continued)

OTHER PUBLICATIONS

P.R. China, State Intellectual Property Office, International Search Report for International Application No. PCT/CN2009/073789; date of mailing: Jan. 14, 2010.
(Continued)

*Primary Examiner* — Junior Mendoza
(74) *Attorney, Agent, or Firm* — Bright IP Law Offices

(57) ABSTRACT

The present invention provides a content locating method and a content delivery network node. In this case, the content locating method provided by the present invention comprises: receiving by a first content delivery network CDN node a service request sent by a service control function entity or an IPTV service control function entity, wherein this service request carries a content identifier which is used to indicate requesting content corresponding to this content identifier; if the first CDN node cannot provide the content service requested by the service request, then the first CDN node sends an inquiry request to a CDN global controller so as to acquire the information about a second CDN node which can provide the content service requested by the service request and request the second CDN node to provide the content service. By way of the present invention, the pressure of the CDN global controller can be reduced and the processing delay of CDN can be shortened.

7 Claims, 6 Drawing Sheets

(51) Int. Cl.
*H04N 21/231* (2011.01)
*H04N 21/239* (2011.01)
*H04N 21/472* (2011.01)
*H04N 21/658* (2011.01)
*H04L 29/08* (2006.01)

(52) U.S. Cl.
CPC ... *H04N 21/2393* (2013.01); *H04N 21/23103* (2013.01); *H04N 21/23116* (2013.01); *H04N 21/47202* (2013.01); *H04N 21/6581* (2013.01)

(58) Field of Classification Search
CPC ........... H04N 21/2393; H04N 21/2396; H04N 21/2408; H04N 21/6377; H04N 21/647; H04N 21/654; H04N 21/23103; H04N 21/47202; H04N 21/6125; H04N 21/6581; H04N 21/6587; H04N 21/2385; H04L 67/1002; H04L 67/1006; H04L 67/1008
USPC .......................................................... 725/93
See application file for complete search history.

(56) References Cited

U.S. PATENT DOCUMENTS

| | | | | |
|---|---|---|---|---|
| 2008/0034393 | A1* | 2/2008 | Crayford | 725/87 |
| 2008/0071859 | A1* | 3/2008 | Seed | H04L 67/1095 709/203 |
| 2008/0127255 | A1* | 5/2008 | Ress et al. | 725/38 |
| 2008/0155059 | A1* | 6/2008 | Hardin et al. | 709/218 |
| 2008/0215755 | A1 | 9/2008 | Farber | |
| 2009/0037960 | A1* | 2/2009 | Melby | H04N 7/173 725/87 |
| 2013/0013747 | A1* | 1/2013 | Cranor | H04L 67/1034 709/219 |
| 2015/0163523 | A1* | 6/2015 | Benya | H04N 7/17318 725/93 |

FOREIGN PATENT DOCUMENTS

| | | |
|---|---|---|
| CN | 101035264 A | 9/2007 |
| CN | 101110947 A | 1/2008 |
| CN | 101330590 A | 12/2008 |
| CN | 101394423 A | 3/2009 |
| CN | 101394541 A | 3/2009 |
| EP | 2063598 A1 | 5/2009 |
| GB | 2427725 A | 1/2007 |
| JP | 2006-94106 A | 4/2006 |
| KR | 10-2008-0063715 A | 7/2008 |
| RU | 2219678 C2 | 12/2003 |
| WO | 03088065 A1 | 10/2003 |
| WO | 2008034352 A1 | 3/2008 |

OTHER PUBLICATIONS

EPO, Extended European Search Report for Application No. 09842892.3 mailed Aug. 28, 2013.
Russia Patent Office, Office Action I for Application No. 2011144802 mailed in 2013.
Russia Patent Office, Office Action II for Application No. 2011144802 mailed in 2014.
SIPO, Office Action for Application No. 200910134425.0 mailed Apr. 1, 2014.
SIPO, Office Action for Application No. 200910134425.0 mailed Oct. 14, 2014.

* cited by examiner

CONTENT LOCATING METHOD AND CONTENT DELIVERY NETWORK NODE

CROSS REFERENCE TO RELATED APPLICATION

This Application claims priority to PCT Application No. PCT/CN2009/073789, filed on Sep. 7, 2009, entitled "Content Location Method and Content Delivery Network Node," which is hereby incorporated by reference in its entirety.

FIELD OF THE INVENTION

The present invention relates to the field of mobile communication technology, and in particular to a content locating method and a content delivery network node.

BACKGROUND OF THE INVENTION

The interactive network television, which is also called as Internet Protocol Television (abbreviated as IPTV), refers to a general term of the devices which provide users with, via an IP bearer network, services such as the live broadcast, video on demand, time shift playing and so on of the television programs which can support interaction capability. With the development of IPTV, the number of IPTV users increases continuously, which proposes higher requirements on the systems in terms of performance and reliability and so on. In this case, as to the content delivery function of interactive network, in order to reduce the interaction between the parts of the system, it requires that the internal modules of the content interaction network have definite functions and responsibility and requires that the content delivery and service procedure are brief and reliable.

Currently, the IPTV standards are mainly based on two kinds of architectures of Next Generation Network (abbreviated as NGN) IP multimedia subsystem (abbreviated as IMS) and NGN non-IMS, which can provide video on demand, live broadcast, video recording and some new services for the users.

The content delivery network (abbreviated as CDN) in the IPTV architecture plays an important role in aspects such as quality of experience (abbreviated as QoE) guarantee and system stability in the IPTV system. Each important function entity inside the CDN is mainly used for achieving content locating technology, scheduling and storage functions.

Currently, as to the content locating technology, both the content locating and playing require to be performed by a CDN master controller, and in the situation of a large scale of users concurring, the CDN master controller may cause processing delay, thus affecting system performance and becoming a bottleneck of system performance. Although processing delay can be reduced by the manner of increasing CDN master controllers to form distributed CDN master controllers to share loads, this manner increases the complexity and building costs of the CDN master controllers.

SUMMARY OF THE INVENTION

In view of this situation, the present invention provides an improved content locating solution to solve the problems existing in the prior art that the processing delay is long and the costs are high.

A content locating method is provided according to one aspect of the present invention.

The content locating method according to the present invention comprises: receiving by a first content delivery network CDN node a service request sent by a service control function entity or an IPTV service control function entity, wherein this service request carries a content identifier which is used to indicate requesting content corresponding to this content identifier; if the first CDN node cannot provide the content service requested by the service request, then sending by the first CDN node an inquiry request to a CDN global controller, so as to acquire the information of a second CDN node which can provide the content service requested by the service request and requesting the second CDN node to provide the content service.

Another content locating method is provided according to another aspect of the present invention.

The content locating method according to the present invention comprises: receiving by a service control function entity or an IPTV service control function entity a service request from a user equipment, wherein this service request carries address information of the user equipment and an identifier of content requested by the user equipment; selecting by the service control function entity or IPTV service control function entity a CDN node which is closest to an area to which the user equipment belongs according to the address information; and sending by the service control function entity or IPTV service control function entity a service request message to the CDN node to request the CDN node to provide content service for the user equipment.

A content delivery network node is provided according to yet another aspect of the present invention.

The content delivery network node according to the present invention includes: a media control function entity and at least one content delivery function entity. In this case, the media control function entity includes: a receiving module, a judging module, a selecting module, an inquiring module and a sending module, wherein the receiving module is used for receiving a service request sent by a service control function entity or an IPTV service control function entity, wherein the service request carries a content identifier which is used to indicate requesting content corresponding to the content identifier; the judging module is used for judging whether the content delivery network node can provide the content service requested by the service request; the selecting module is used for selecting a content delivery function entity which provides the content service in the situation that the judgment result of the judging module is YES; the inquiring module is used for sending an inquiry request to a CDN global controller to acquire a second CDN node which can provide the content service in the situation that the judgment result of the judging module is NO; the sending module is used for sending a service request to the second CDN node acquired by the inquiring module to request the second CDN node to provide the content service; and the content delivery function entity is used for providing the content service for user equipment.

By way of the above at least one solution of the present invention, a service request is sent to a CDN node which is closest to the user equipment but not sent to a CDN global controller; if this CDN node cannot provide the content service requested by the user equipment for the user equipment after having receiving this service request, then it sends an inquiry request to the CDN global controller and forwards the service request to a CDN node which can provide the above content service for the user equipment, thus relieving the pressure of the CDN global controller, shortening the processing delay of the CDN, and at the same time, it will neither increase the complexity of the CDN master controller nor will increase equipment costs.

Other features and advantages of the present invention will be described in the following description and partly become obvious from the description, or be understood by implementing the present invention. The objects and other advantages of the present invention can be realized and obtained through the structures specially indicated by the description, claims and drawings.

BRIEF DESCRIPTION OF THE ACCOMPANYING DRAWINGS

The drawings described here are used to provide a further understanding of the present invention and form a part of the specification, which are used to explain the present invention together with the embodiments of the present invention and do not limit the present invention. In the drawings.

DETAILED DESCRIPTION OF EMBODIMENTS

Brief Description on Functions

From the current CDN construction principles of view, 20% of the contents are deployed on a CDN node which is closest to the user, however, this CDN node can provide 80% of video on demand service, and the remaining 20% contents of the video on demand service are deployed on the center node (generally the center node stores 100% of the contents). Moreover, in the situation that the failure rate of edge nodes is very low, actually nearly 80% of the video on demand service can perform global redirection service without a CDN master controller. Accordingly, the embodiments of the present invention provide an improved content locating solution regarding the problem that failure is caused due to processing delay or load being too large which is caused by both the content locating and playing needing to be performed by a CDN master controller. In the embodiments of the present invention, a service control function entity or an IPTV service control function entity sends a service request to a CDN node which is closest to an area to which the user equipment belongs, and when this CDN nodes cannot provide the content service requested by this user equipment for the user equipment, it acquires a CDN node which can provide this content service by a CDN master controller and sends the service request to the CDN node which can provide the above content service.

The embodiments of the present invention and the features in the embodiments can be combined with each other if there is no conflict.

The preferred embodiments of the invention will be described in conjunction with the accompanying drawings, and it shall be understood that the preferred embodiments described here are only for describing and explaining the present invention and not to limit the present invention.

For better understanding the technical solution provided by the embodiments of the present invention, before describing the technical solution provided by the embodiments of the present invention, an IPTV system based on NGN applied by the embodiments of the present invention will be introduced.

Figure 1:
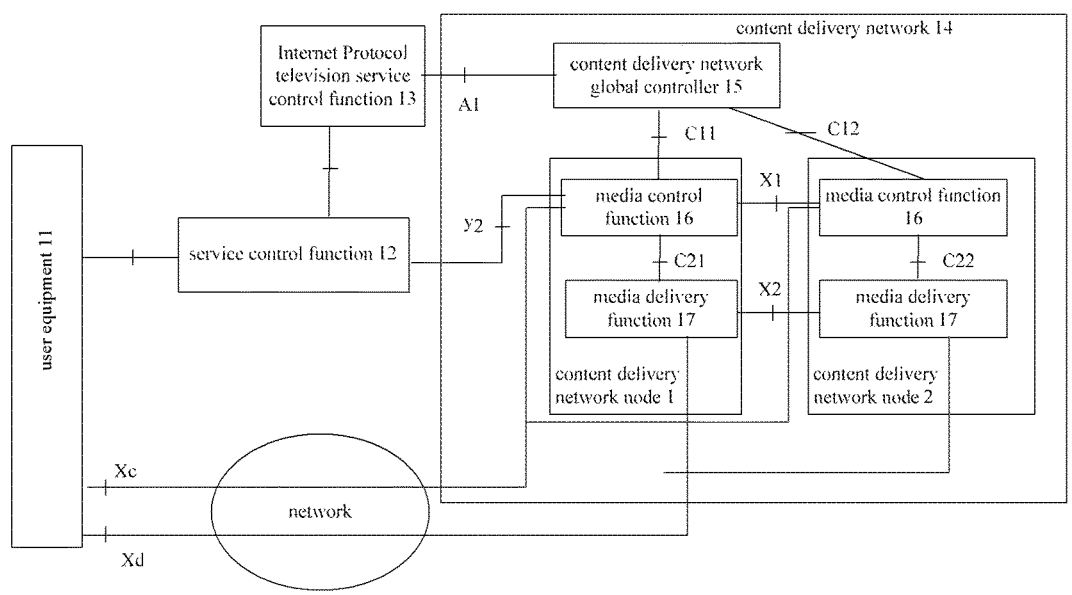
FIG. 1 is a schematic diagram of the structure of an IPTV system based on NGN according to the embodiments of the present invention.

FIG. 1 is a schematic diagram of the structure of an IPTV system based on NGN according to the embodiments of the present invention. As shown in FIG. 1, the IPTV system based on NGN mainly comprises: user equipment (abbreviated as UE) 11, service control function (abbreviated as SCF, if in the IMS of the NGN, then it is core IMS) 12, IPTV service control functions (abbreviated as IPTV SCF) 13, and a content delivery network (abbreviated as CDN) 14.

In this case, the CDN 14 further includes: a content delivery network global controller, wherein the content delivery network global controller can also be referred to as CDN control function/content delivery and storage control function (Content Delivery Network (Global) Controller, or be referred to as Content Delivery & Storage Control Functions/Content Delivery Network Control Functions/Content Distribution & Location Control Functions, abbreviated as CD&SCF/CDNCF/CD&LCF) 15, a media control function entity (Media Control Function or Content Control Function or Cluster Controller or Content Distribution & Delivery & Location Control Functions, abbreviated as MCF or CCF or CC or CD&D&LCF) 16 and a media delivery function entity (Media Delivery Function or Content Delivery Function or Content Delivery and Storage Function, abbreviated as MDF or CDF or CD&SF) 17. In this case, the CDN node (or example) (1, 2 . . . n) contains one media control function entity 16 and a plurality of media delivery function entities 17. In this case, the CDN node is not limited to the above CDN node 1 and CDN node 2 (shown in the figure), and it can be more than one.

Each entity and interface of the IPTV system based on NGN will be described in the following respectively.

The UE 11 in particular can be a cell phone with mobile capability, a set-top box of a fixed network, a soft terminal based on software implementation which achieves the set-top box function, and further include function entities such as home gateway. The UE can achieve IPTV services such as video on demand, live broadcast by interacting with users.

As a set of the main function entities at NGN service control level, the SCF 12 being connected to the UE 11 is mainly used for session control, service authentication, authorization, charging, etc. In the case of IMS network, this entity is Core IMS. The Core IMS is mainly used for providing a session control mechanism based on SIP, authenticating and authorizing the IPTV end users, and requesting a resource admission control subsystem to allocate resources, etc. The Core IMS achieves the functions such as security, quality of service (abbreviated as QoS), charging, roaming, etc. by interacting with IPTV terminals, IPTV application function entities and content delivery function entities to perform a SIP session.

The IPTV SCF 13 being connected to the above SCF 12 via the Session Initiation Protocol (abbreviated as SIP) is used for providing service authorization when a session is initiated or modified, the functions of which include: checking user information and finding whether the user can legally use the selected content; credit limit and credit control; and selecting for the system an IPTV media control function entity 16 to provide an preliminary service, wherein this function entity mainly focuses on IPTV services such as video on demand, live broadcast, video recording, time shift. The IPTV SCF 13 is an IPTV SIP application server in the case of IMS network, corresponds to a set of IPTV Control and IPTV Applications in the Open IPTV Forum standard organization, and corresponds to the IPTV Application Function, Application Support Function and Service Support Function in the ITU-T standard.

The CDN 14 is connected to the UE via Xc and Xd interfaces, wherein it is connected to the UE via the Xc interface for controlling the media stream RTSP, and it is connected to the UE via the Xd interface for transmitting the media stream RTP and downloading media (which can use the HTTP protocol).

The interface A1 is mainly used for the CDN master controller 15 returning the status information about each CDN node, for example whether to provide service, managed by it to the IPTV SCF 13.

For C21/C22 interface (RTSP interface), the user media control function entity 16 performs media control to the media delivery function entity 17 via the C21/C22 interface (RTSP interface).

For C11/C12 interface (control interface), it is implemented using the SIP protocol, and the CDN node inquires the CDN global controller 15 via the C11/C12 interface about the information of other CDN nodes which can provide video on demand service; and the CDN node can also report the service status information and so on of each node to the CDN global controller 15 via the C11/C12 interface.

Method Embodiments

A content locating method is first provided according to the embodiments of the present invention.

Figure 2:
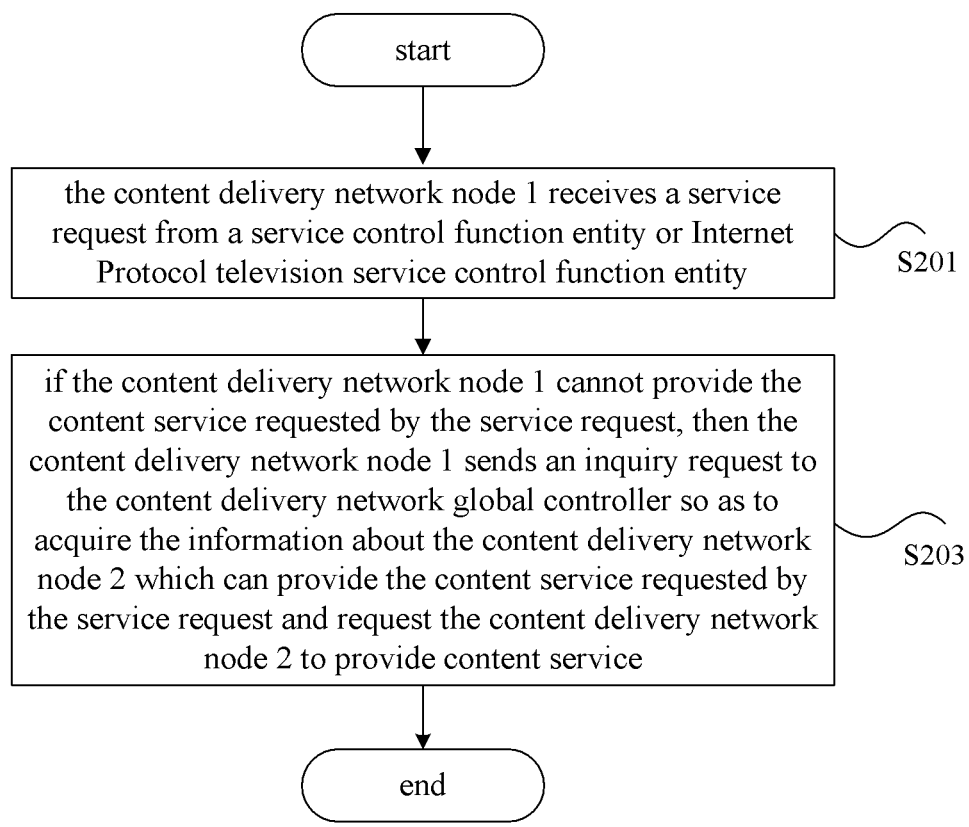
FIG. 2 is a flow chart of a content locating method according to the embodiments of the present invention.

FIG. 2 is a flow chart of a content locating method according to the embodiments of the present invention. As shown in FIG. 2, the content locating method according to the embodiments of the present invention comprises the following steps (steps S201 to S203):

Step S201: a CDN node 1 receives a service request sent by a service control function entity or an IPTV service control function entity, wherein this service request carries a content identifier which is used to indicate requesting content corresponding to the content identifier; and Step S203: if said CDN node 1 is unable to provide the content service requested by said service request, then said CDN node 1 sends an inquiry request to a CDN global controller so as to acquire the information of a CDN node 2 which can provide the content service requested by said service request, and requests the CDN node 2 to provide said content service.

The detail of the above processes will be further described in the following.

(I) Step S201

During practical implementation, before the CDN node 1 receives the above service request, the triggering of the process of step S201 can include the following steps:

step 1: a service control function entity or IPTV service control function entity receives a service request sent by a user equipment, wherein this service request carries an address of the user equipment and a content identifier;

step 2: the service control function entity or IPTV service control function entity selects the CDN node 1 which is closest to the user equipment according to an area to which the user equipment belongs; and step 3: the service control function entity or IPTV service control function entity sends the above service request to the CDN node 1.

In particular, the above service request includes but not limited to at least one of the following: video on demand request, network video recording request, and real video on demand request.

(II) Step S203

During practical implementation, after having received the above service request, the CDN node 1 first judges whether it can provide the content service requested by this service request, and in particular, the CDN node 1 judges whether it can provide the above content service by way of the following methods:

step 1: the CDN node 1 judges whether there is content corresponding to the above content identifier in its content delivery function entity, if yes, then continuing to execute step 2, otherwise, the CDN node 1 determines that it cannot provide the above content service; and step 2: the CDN node 1 judges whether the content service currently provided by its content interaction entity has reached a given threshold value (for example, it reaches 80%), if yes, then it is determined that the CDN node 1 cannot provide the content service requested, otherwise, it is determined that the CDN node 1 can provide the content service requested.

By way of the above steps 1 and 2, if the CDN node 1 judges that it cannot provide the content service requested by the service request, then the CDN node 1 sends an inquiry request to the CDN global controller to acquire the information about a CDN node which can provide this content service, and after having received this inquiry request, the CDN global controller inquires about a CDN node which can provide the above content service and returns a response message to the CDN node 1, the response message carrying the information about the CDN node which can provide the above content service. In particular, the CDN global controller can return list information about all the CDN node, which can provide the above content service, to the CDN node 1, and can also only return the information about the optimal CDN node to the CDN node 1, and the CDN node 1 acquires the information about a CDN node 2 (which can be the optimal node) which can provide the above content service according to the node information returned by the CDN global controller.

After having received the information about the CDN node 2, the CDN node 1 sends a service request to the CDN node 2 according to the information about the CDN node 2 to request the CDN node 2 to provide the above content service for the user equipment; after the second CDN node receives this service request, a session (in particular, this session is a RTSP session) is set up between a second media control function entity in the CDN node 2 and a second media delivery function entity which provides content service, and a identifier of this session (RTSP Session ID) is returned to the CDN node 1, and the CDN node 1 returns the identifier of this session to the user equipment.

In particular, in the IPTV system based on NGN, after the CDN node 2 has received the above service request, this method further comprises the following steps:

(1) the media control function entity in the CDN node 2 inquires URL address information about a content delivery function entity which can serve according to the service status of the content delivery function entity inside its node, and this content delivery function entity sends a request of RTSP description message (RTSP DESCRIBE), which RTSP description message describes requested program information. At the same time, the URL in this request further carries user information about the user equipment and path information about the requested program, etc.

(2) the media delivery function entity in the CDN node 2 returns the program description information about the media delivery function entity which can provide service to the media control function entity, the program description information including information such as content size, name, playing time, IP address and port.

The RTSP description message in steps (1) and (2) is optional, and the media control function entity can contain the description information about content in the selected media delivery function entity.

(3) the media control function entity in the CDN node 2 sends a RTSP session setup message to the media delivery function entity in the CDN node 2 to request to set up a session connection of media channel(s).

(4) the media delivery function entity in the CDN node 2 returns the session connection RTSP Session ID of the media delivery function entity, which can provide service, to the media control function entity.

In this case, after the identifier of the above session has been returned to said user equipment, the user equipment sends a playing request to said CDN node 2 according to the identifier of the above session to request to play the content corresponding to said content identifier.

Preferably, if the CDN node 1 determines that it can provide said content service, then a session (RTSP Session) is set up between a first media control function entity in the CDN node 1 and a first media delivery function entity which provides content service in the CDN node 1, and the identifier of this session is returned to the user equipment.

In particular, after the identifier of this session has been returned to the user equipment, the user equipment sends a playing request to the CDN node 1 according to the identifier of said session to request to play the content corresponding to the above content identifier.

During practical implementation, in the situation that the CDN node 1 determines that it can provide the above content service, this method can comprise the following steps:

(1) the media control function entity in the CDN node 1 inquires about URL address information of the media delivery function entity which can serve managed by it inside its node and sends a request of setting up a session to the media delivery function entity selected.

In this case, step (1) can further include the following: the media control function entity in the CDN node 1 sends a RTSP DESCRIBE message to the media delivery function entity and inquires about the SDP information of the media delivery function entity which can provide service, wherein the RTSP DESCRIBE message carries the URL address information and the description information about media contents; the media delivery function entity return an acknowledgment ACK message which contains the SDP information to the media control function entity; the media control function entity initiates a RTSP SETUP message to the media delivery function entity and the user sets up a RTSP session connection with the media delivery function entity; and the media delivery function entity returns an ID, i.e. RTSP Session ID, set up by the content delivery session to the media control function entity.

(2) the media control function entity returns the ID of the content delivery session to the user equipment through a session initiation response.

(3) the user equipment requests the CDN node 1 to perform the video on demand, and the CDN node 1 provides stream service for the user equipment.

In this case, step (3) can further include: the media control function entity requests the media delivery function entity to RTSP RECORD (record) or RTSP PLAY (play), requesting to play the content; the media delivery function entity make acknowledgement, i.e. playing will be performed soon, for the media control function entity; the media control function entity make acknowledgement, i.e. playing will be performed soon, for the user equipment; and the media delivery function entity in the CDN node 1 sends a RTP stream to the user equipment for performing the playing or recording.

The above content locating method according to the embodiments of the present invention can reduce the load of the CDN global controller and reduce the processing delay.

Another content locating method is further provided according to the embodiments of the present invention.

Figure 3:
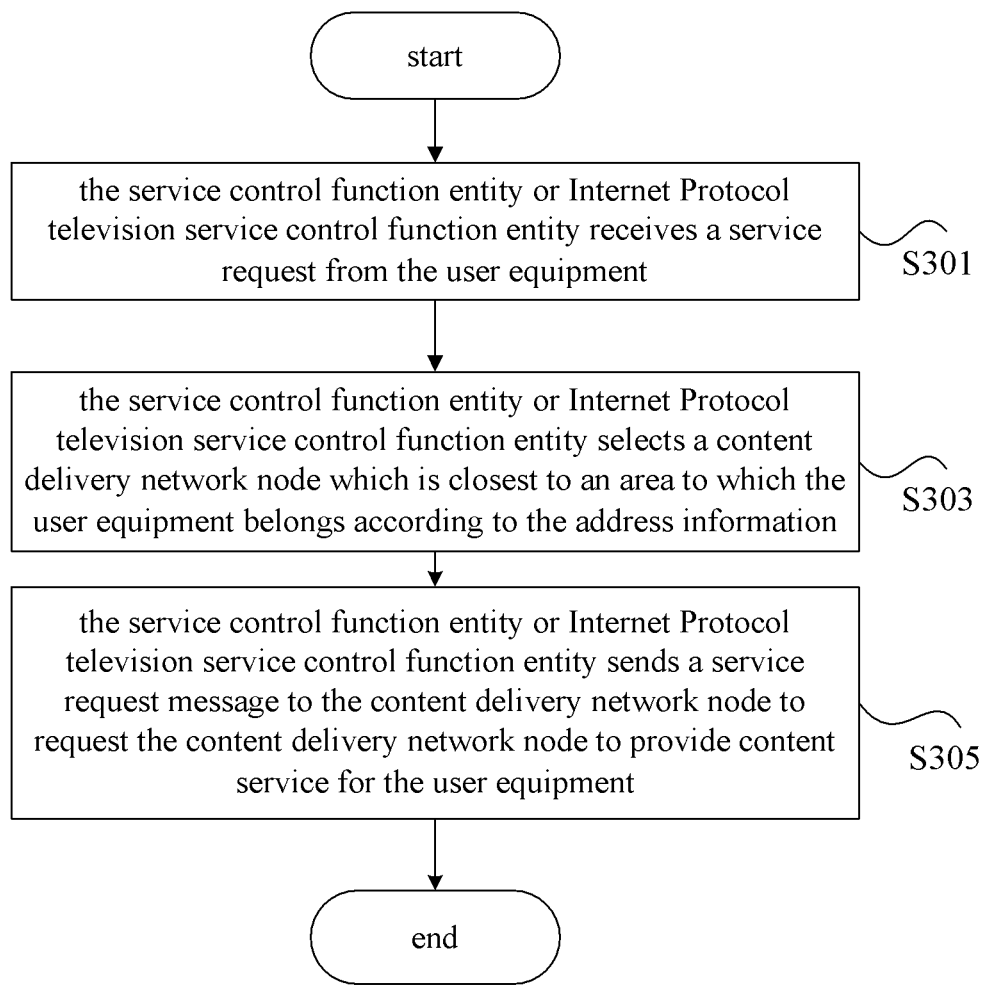
FIG. 3 is a flow chart of another content locating method according to the embodiments of the present invention.

FIG. 3 is a flow chart of another content locating method according to the embodiments of the present invention. As shown in FIG. 3, another content locating method according to the embodiments of the present invention comprises the following steps (steps S301 to S305):

Step S301: a service control function entity or an IPTV service control function entity receives a service request from a user equipment, wherein this service request carries address information about the user equipment and an identifier of the content requested by the user equipment;

Step S303: the service control function entity or IPTV service control function entity selects a CDN node which is closest to an area to which the user equipment belongs according to the above address information; and Step S305: the service control function entity or IPTV service control function entity sends a service request message to the above CDN node to request this CDN node to provide content service for the user equipment.

After having received the above service request message, the above CDN node can perform content locating according to the above method shown in FIG. 2.

The above content locating method provided by the embodiments of the present invention can send a service request to a CDN node which is closest to the user equipment, thus reducing the processing delay.

In order to further understand the practical implementation process of the technical solution provided by the embodiments of the present invention, it will be described hereafter through particular embodiments.

Embodiment I

Figure 4:
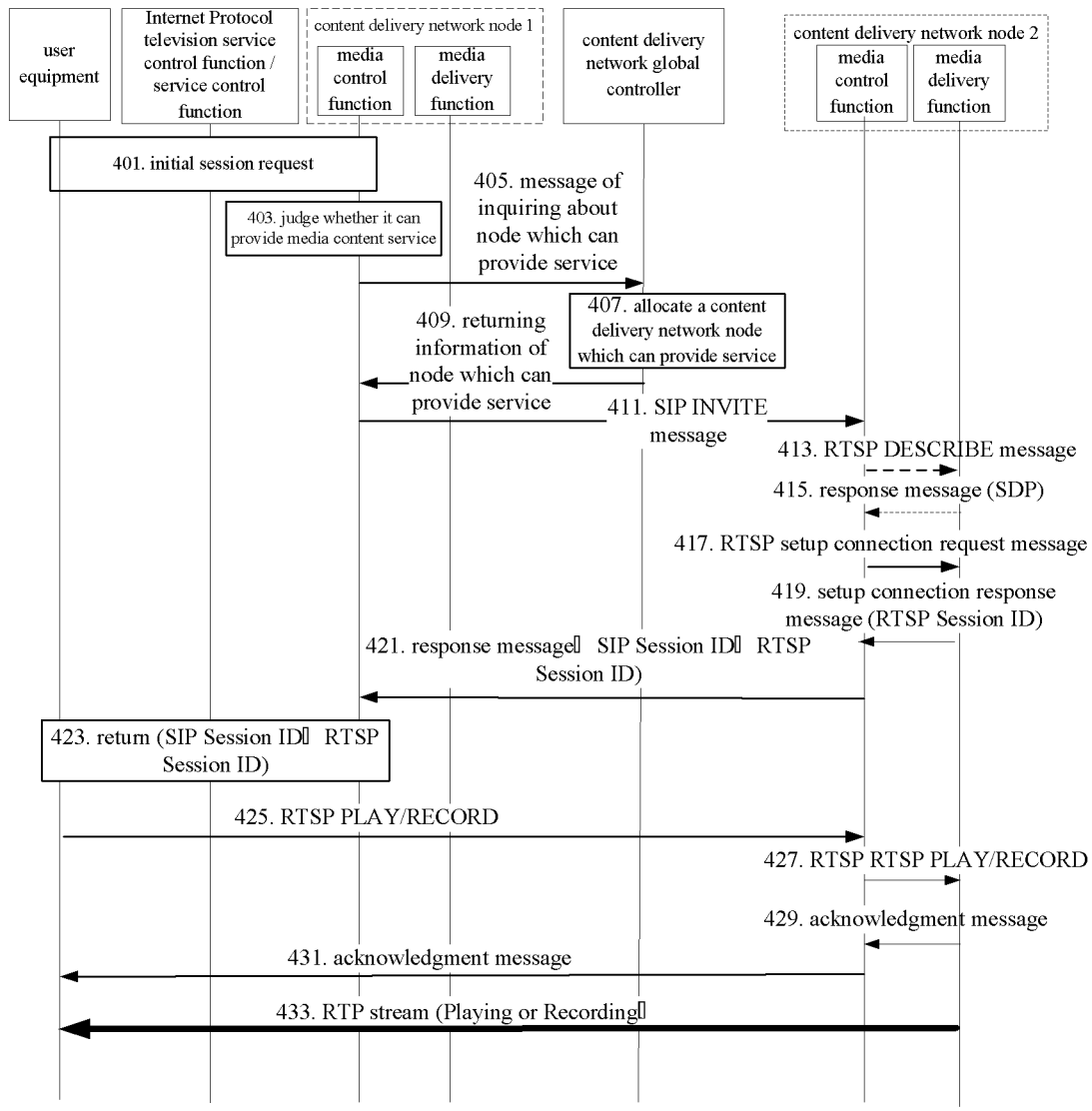
FIG. 4 is a flow chart of embodiment I.

In this embodiment, the CDN node selected by the service control function entity or IPTV service control function entity cannot provide the content service requested by the user equipment, and FIG. 4 is a flow chart of this embodiment. Providing content service for the user equipment in this embodiment will now be described hereinafter in conjunction with FIG. 1, and as shown in FIG. 4, this procedure mainly include the following steps:

step S401: the service control function entity 12 or 13 receives a session initiation (SIP INVITE) request sent by the UE 11, wherein the SDP in this request includes a port, a content identifier and an IP address of the UE 11. The service control function entity 12 or 13 selects a CDN node nearby, which is CDN node 1 in this embodiment, according to an area to which the UE 11 belongs to provide service;

moreover, the IPTV service control function entity 13 will regularly detect the status of service which the content delivery network 14 is providing and select a node controller 16 which is close as much as possible and has no failure;

step S403: the entity 16 of CDN node 1 which receives the session initiation (SIP INVITE) request judges whether the CDN node 1 can provide media service, and in particular, the basis of the judgment includes but not limited to the following:
  (1) whether the service status of the media delivery function entity 16 managed by the CDN node 1 reaches the maximum (for example 80% of serving capability of the CDN node 1 being used); and
  (2) the requested content does not exist in this CDN node.

step S405: the media control function entity 16 of the CDN node 1 determines that the CDN node 1 cannot provide media service in the above step, then the media control function entity 16 in the CDN node 1 sends an SIP OPTION message to the CDN global controller 15 to inquire about an optimal CDN node which can provide service, this node containing IP address and port number (which can be based on status information such as the distance between this node and the UE 11, and the load of this node);

step S407: the CDN global controller 15 inquires about a CDN node which can provide service;

the optimal node can only be returned or a plurality of selectable nodes with different priorities can be returned;

step S409: the CDN global controller 15 returns the inquired information of the node (or node list) which can provide service to the media control function entity 16 in the CDN node 1;

step S411: the CDN node 1 sends an SIP INVITE message which includes SIP Session ID information to the media control function entity 16 in the CDN node 2 selected by the CDN node 1 to request the CDN node 2 to provide the service requested by the service request;

step S413: the media control function entity 16 in the CDN node 2 inquires about the information of the media delivery function entity 16 which can serve inside the CDN node 2; and the media control function entity 16 also sends a RTSP DESCRIBE message request to the selected media delivery function entity 17, i.e. selecting which program on demand. In this case, the requested URL carries user information, the path information about the program on demand, etc.

step S415: the media delivery function entity 17 in the CDN node 2 returns the program description information of the media delivery function entity 17 which can provide service to the media control function entity 16 via a response message (OK), the program description information including information such as content size, name, playing time, IP address and port.

During practical implementation, if the media delivery function entity 17, which can provide service in the CDN node 1 selected by the media control function entity 16 in the above step S405, may contain media description information, the above steps S413 and S415 can be omitted.

step S417: the media control function entity 16 in the CDN node 2 initiates a RTSP SETUP message to the media delivery function entity 17, and the user sets up a RTSP session connection with the media delivery function entity 17;

step S419: the media delivery function entity 17 in the CDN node 2 returns an ID (i.e. RTSP Session ID) set up by the content delivery session to the media control function entity 16 via a response message (OK);

step S421: the media control function entity 16 in the CDN node 2 returns an ID of the content delivery session, i.e. SIP Session ID and RTSP Session ID, to the media control function entity 16 in the CDN node 1 via a response message;

step S423: the media control function entity 16 in the CDN node 1 binds the ID of the content delivery session, i.e. SIP Session ID and RTSP Session ID, and returns its result to the UE 11 via a session initiation response. In this case, the session initiation response process between media control function entity 16→UE 11 can be implemented using currently available procedures, which will not be described here redundantly;

step S425: the UE 11 requests the media control function entity 16 in the CDN node 2 to RTSP PLAY (playing) or RTSP RECORD (recording), for requesting to play the content, wherein the request carries the RTSP session ID of the media control function entity 16 and the session ID information of the media delivery function entity 17;

step S427: the media control function entity 16 in the CDN node 2 requests the media delivery function entity 17 to RTSP PLAY (playing) or RTSP RECORD (record), for requesting to play the content;

step S429: the media delivery function entity 17 in the CDN node 2 returns acknowledgment information to the media control function entity 16, the acknowledgment information representing the playing will soon be performed;

step S433: the media delivery function entity 17 in the CDN node 2 sends RTP stream(s) to the UE 11 for performing playing or recording.

Embodiment II

Figure 5:
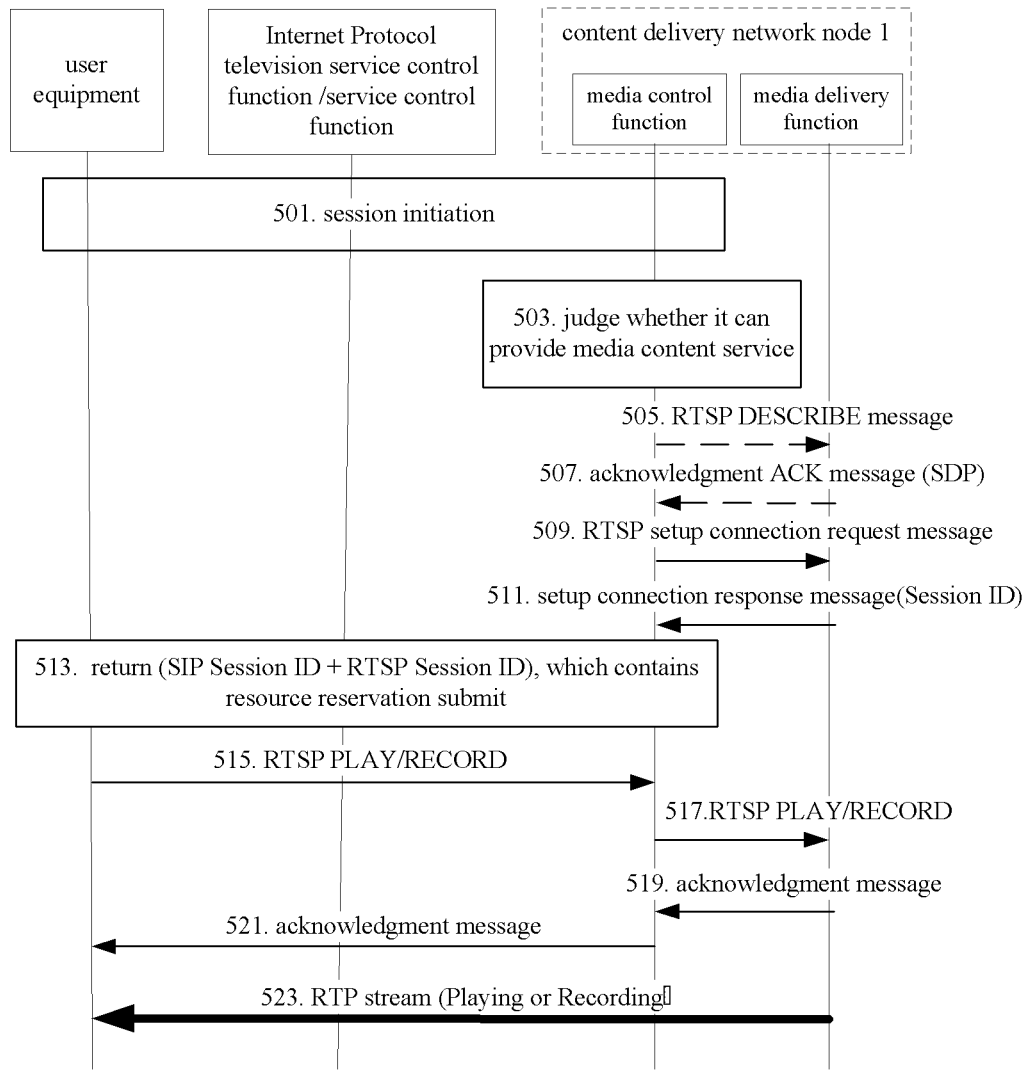
FIG. 5 is a flow chart of embodiment II.

In this embodiment, the CDN node 1 selected by the service control function entity or IPTV service control function entity can provide the content service requested by the user equipment, and FIG. 5 is a flow chart of this embodiment. Providing content service for the user equipment in this embodiment will now be described hereinafter in conjunction with FIG. 1, and as shown in FIG. 5, this procedure mainly include the following steps:

step S501: the service control function entity 12 or IPTV service control function entity 13 receives a session initiation (SIP INVITE) request sent by the UE 11, wherein the SDP in this request includes a port(s), a content identifier and an IP address of the UE 11. The IPTV service control function entity 13 selects a CDN node nearby, which is CDN node in this embodiment, to provide service according to an area to which the UE 11 belongs;

In particular, the IPTV service control function entity 13 will regularly detect the status of service which the content delivery network 14 is providing so as to select a node controller 16 which is close to the user equipment as much as possible and has no failure;

step S503: the media control function entity 16 of the CDN node 1 which receives the session initiation (SIP INVITE) request judges whether it can provide media service;

step S505: the result of judgment of the above step is that there is content on demand by the user in this CDN node 1 and the demand can be accepted, then the media control function entity 16 of the CDN node 1 selects the media delivery function entity 17, which can provide service, inside the node, and the media control function entity 16 sends a RTSP DESCRIBE message to the selected media delivery function entity 17 to inquire about the SDP information of the media delivery function entity 17 which can provide service, the SDP information containing URL address information;

step S507: the media delivery function entity 17 of the CDN node 1 returns an acknowledgment ACK message containing the SDP information to the media control function entity 16;

In this case, the RTSP DESCRIBE inquiry message in steps S505 and S507 is optional, and the media delivery function entity 16, which can provide service inside the node and be selected by the media control function entity 16 in step S505, may already contain the media description information.

step S509: the media control function entity 16 in the CDN node 1 initiates a RTSP SETUP message to the media delivery function entity 17, and the user sets up a RTSP session connection with the media delivery function entity 17;

Step S511: the media delivery function entity 17 in the CDN node 1 returns an ID (i.e. RTSP Session ID) set up by the content delivery session to the media control function entity 16;

step S513: the media control function entity 16 in the CDN node 1 binds the ID of the content delivery session, i.e., SIP Session ID and RTSP Session ID, and returns its result to the UE 11 via a session initiation response. The session initiation response process between media control function entity 16→UE 11 can be implemented using currently available procedures, which will not be described here redundantly;

step S515: the UE 11 requests the media control function entity 16 for RTSP PLAY (playing) or RTSP RECORD (recording), for requesting to play the content, wherein the request carries the RTSP session ID of the media control function entity 16 and the session ID information of the media delivery function entity 17;

step S517: the media control function entity 16 requests the media delivery function entity 17 for RTSP PLAY (playing) or RTSP RECORD (recording), for requesting to play contents;

in this case, selecting RTSP PLAY or RTSP RECORD is determined according to step S519.

step S519: the media delivery function entity 17 returns acknowledgment information (ACK) to the media control function entity 16, the acknowledgment information representing the playing will soon be performed;

step S521: the media delivery function entity 16 returns acknowledgment information (ACK) to the UE 11, representing the playing will soon be performed; and step S523: the media delivery function entity 17 in the CDN node 1 sends RTP stream(s) to the UE 11 for playing or recording.

Apparatus Embodiments

A content delivery network node is further provided according to the embodiments of the present invention.

Figure 6:
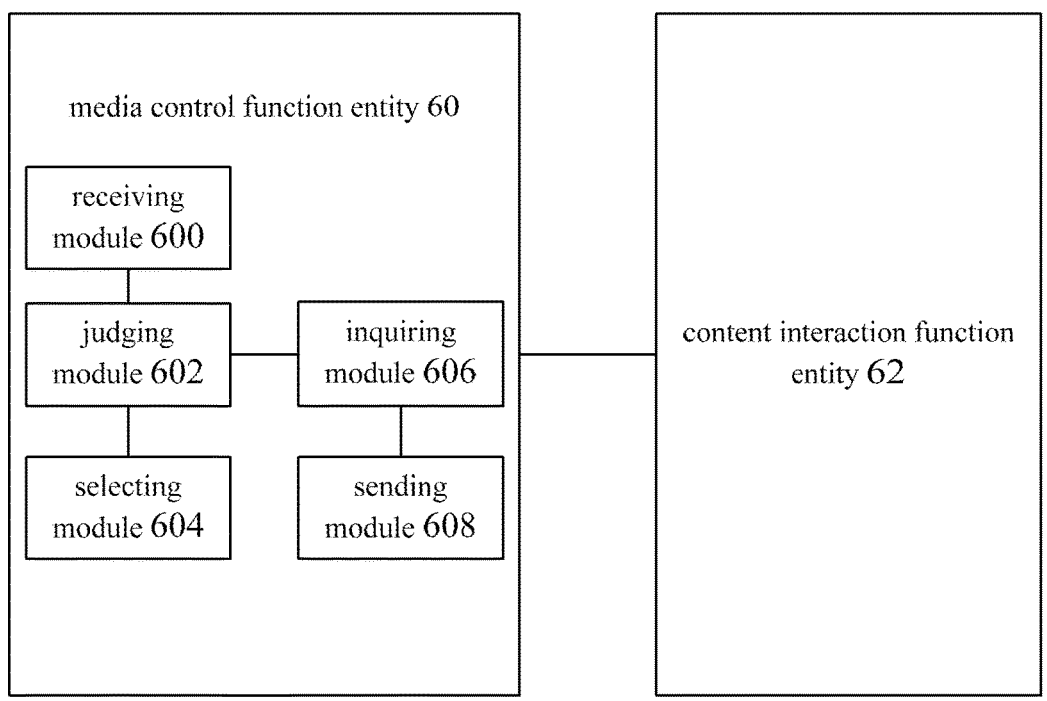
FIG. 6 is a schematic diagram of the structure of a content delivery network node according to the embodiments of the present invention.

FIG. 6 is a schematic diagram of the structure of a content delivery network node according to the embodiments of the present invention. As shown in FIG. 6, the content delivery network node according to the embodiments of the present invention includes: a media control function entity 60 and at least one content delivery function entity 62.

In this case, this media control function entity 60 can include: a receiving module 600, a judging module 602, a selecting module 604, an inquiring module 606 and a sending module 608. In this case, the receiving module 600 is used for receiving a service request sent by a service control function entity or an IPTV service control function entity, wherein this service request carries a content identifier for indicating to request content corresponding to this content identifier; the judging module 602, being connected to the receiving module 600, is used for judging whether this CDN node can provide the content service requested by the above service request; the selecting module 604, being connected to the judging module 602, is used for selecting a content delivery function entity 62 which provides service in the situation that the judgment result of the judging module 602 is YES; and the inquiring module 606, being connected to the judging module 602, is used for sending an inquiry request to a CDN global controller to acquire a second CDN node which can provide the above content service in the situation that the judgment result of said judging module 602 is NO; and the sending module 608, being connected to the inquiring module 606, is used for sending a service request to the second CDN node acquired by the above inquiring module 606 to request the second CDN node to provide the above content service; and The content delivery function entity 62, being connected to the media control function entity 60, is used for providing said content service for the user equipment.

As described above, by way of the technical solution provided by the embodiments of the present invention, the service control function entity or IPTV service control function entity sends a service request to a CDN node which is closest to an area to which the user equipment belongs; and if this CDN node can provide the content service requested by this user equipment for the user equipment, then the service control function entity or IPTV service control function entity sends a service request message to the CDN node to request the CDN node to provide content service for the user equipment. If the CDN node selected by the service control function entity or IPTV service control function entity cannot provide the content service requested by this user equipment for the user equipment, then the CDN node which can provide this content service is acquired by a CDN global controller and the service request is sent to the CDN node which can provide the above content service. The technical solution provided by the present invention can solve the problem in the prior art that the efficiency of the content locating method is low, can shorten the processing delay of the CDN, and at the same time it will not increase the costs of equipment. Moreover, it can relieve the pressure of the CDN global controller, prevent the CDN global controller from becoming a performance bottleneck, and ensure its working reliability.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A content locating method, comprising:
   receiving, by a first content delivery network (CDN) node, a first service request sent by a service control function entity or an IPTV service control function entity, wherein the first service request carries a content identifier which is used to indicate requesting content corresponding to the content identifier; and
   if the first CDN node is unable to provide content service requested by the first service request, then sending, by the first CDN node, an inquiry request to a CDN global controller, so as to acquire information of a second CDN node which is able to provide the content service requested by the first service request, and requesting the second CDN node to provide the content service;

wherein the step of acquiring by the first CDN node the information of the second CDN node comprises:

sending, by the first CDN node, an inquiry request to the CDN global controller;

allocating, by the CDN global controller, the second CDN node, which is able to provide the content service requested, or a plurality of CDN nodes, including the second CDN node, which are able to provide the content service requested;

returning, by the CDN global controller, a response message to the first CDN node, wherein the response message carries the information of the second CDN node or list information of a plurality of CDN nodes including the second CDN node; and acquiring, by the first CDN node, the information of the second CDN node from the response message;

wherein before the first CDN node receives the first service request, the method comprises: receiving, by the service control function entity or IPTV service control function entity, a second service request sent by a user equipment, wherein the second service request carries the content identifier and an address of the user equipment; selecting, by the service control function entity or IPTV service control function entity, the first CDN node which is closest to the user equipment according to an area to which the user equipment belongs; and sending, by the service control function entity or IPTV service control function entity, the first service request to the first CDN node, wherein the first service request includes at least one of the following: a video on demand request, a network video recording request, and a real video on demand request;

wherein the step of the first CDN node requesting the second CDN node to provide the content service comprises: sending by the first CDN node the first service request to the second CDN node according to the information of the second CDN node; receiving by the second CDN node the first service request, setting up a session between a second media control function entity in the second CDN node and a second media delivery function entity in the second CDN node with the second media delivery function entity providing the content service, and returning an identifier of the session to the first CDN node; and returning by the first CDN node the identifier of the session to user equipment.

2. The method according to claim 1, wherein after the first CDN node receives the first service request, the method comprises:

determining by the first CDN node whether the first CDN node is able to provide the content service requested, according to judgment of whether the content corresponding to the content identifier exists in the first CDN node and/or whether content service currently provided by a content interaction entity of the first CDN node has reached a given threshold value; and wherein in the situation that results of all the judgments are YES, the first CDN node determines that the first CDN node is able to provide the content service; otherwise the first CDN node determines that the first CDN node is not able to provide the content service.

3. The method according to claim 1, wherein after returning the identifier of the session to the user equipment, the method further comprises:

sending, by the user equipment, a playing request to the second CDN node according to the identifier of the session to request to play the content corresponding to the content identifier.

4. The method according to claim 1, wherein if the first CDN node determines that the first CDN node is able to provide the content service, then the method further comprises:

setting up a session between a first media control function entity in the first CDN node and a first media delivery function entity in the first CDN node with the first media delivery function entity providing the content service, and returning the identifier of the session to the user equipment.

5. The method according to claim 4, wherein after returning the identifier of the session to the user equipment, the method further comprises:

sending, by the user equipment, a playing request to the first CDN node according to the identifier of the session to request to play the content corresponding to the content identifier.

6. A content locating method, comprising:

receiving, by a service control function entity or an IPTV service control function entity, a service request sent by a user equipment, wherein the service request carries address information of the user equipment and an identifier of content requested by the user equipment;

selecting, by the service control function entity or IPTV service control function entity, a content delivery network (CDN) node which is closest to an area to which the user equipment belongs according to the address information; and sending, by the service control function entity or IPTV service control function entity, a service request message to the CDN node to request the CDN node to provide content service for the user equipment;

wherein if the CDN node cannot provide content service for the user equipment, the CDN node sends an inquiry request to a CDN global controller, receives a response message from the CDN global controller, wherein the response message carries the information of another CDN node or list information of a plurality of CDN nodes, including another CDN node, which are able to provide the content service requested; and acquires the information of another CDN node from the response message and requests another CDN node to provide the content service;

wherein the CDN node requests another CDN node to provide the content service comprises: sending by the CDN node the service request to another CDN node according to the information of the another CDN node; receiving by another CDN node the service request, setting up a session between a media control function entity in another CDN node and a media delivery function entity in another CDN node with the media delivery function entity providing the content service, and returning an identifier of the session to the CDN node; and returning by the CDN node the identifier of the session to user equipment.

7. A content delivery network (CDN) node, comprising: a media control function entity and at least one content delivery function entity, wherein the media control function entity includes: a hardware processor coupled with a memory and configured to execute program modules stored on the memory, wherein the program modules comprise:

a receiving module for receiving a service request sent by a service control function entity or an IPTV service control function entity, wherein the service request carries a content identifier which is used to indicate requesting content corresponding to the content identifier;

a judging module for judging whether the content delivery network node is able to provide content service requested by the service request;

a selecting module for selecting a content delivery function entity which provides the content service in the situation that the judgment result of the judging module is YES;

an inquiring module for sending an inquiry request to a CDN global controller in the situation that the judgment result of the judging module is NO to acquire a second CDN node which is able to provide the content service;

a sending module for sending a service request to the second CDN node acquired by the inquiring module to request the second CDN node to provide the content service; and the content delivery function entity connected to the media control function entity and configured to provide the content service for a user equipment;

wherein the inquiring module further for sending an inquiry request to a CDN global controller, receiving a response message from the CDN global controller, wherein the response message carries the information of the second CDN node or list information of a plurality of CDN nodes, including the second CDN node, which are able to provide the content service requested; and acquiring the information of the second CDN node from the response message;

wherein the CDN node, which is closest to an area to which the user equipment belongs, is selected, by the service control function entity or IPTV service control function entity, according to address information of the user equipment;

wherein the CDN node is further configured to request the second CDN node to provide the content service by the following steps: sending by the CDN node the service request to the second CDN node according to the information of the second CDN node; receiving by the second CDN node the service request, setting up a session between a second media control function entity in the second CDN node and a second media delivery function entity in the second CDN node with the second media delivery function entity providing the content service, and returning an identifier of the session to the first CDN node; and returning by the first CDN node the identifier of the session to user equipment.

* * * * *